Patented Oct. 10, 1950

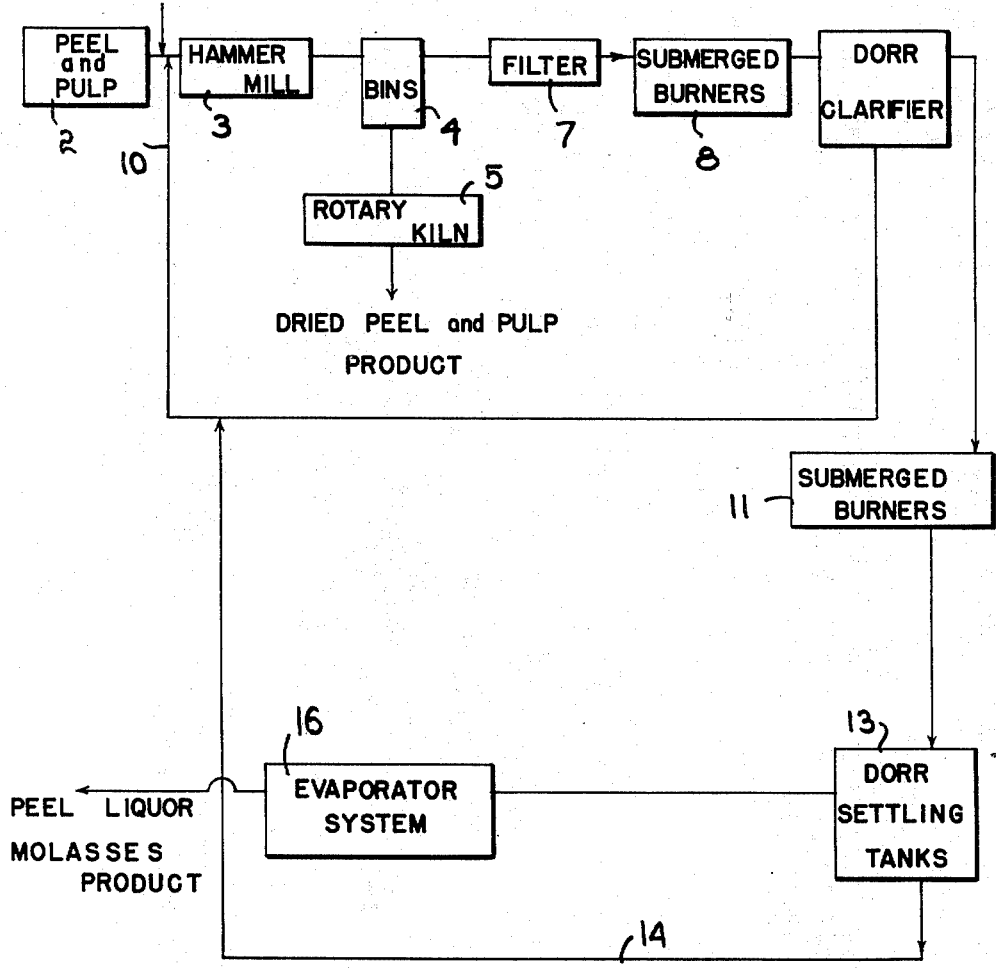

2,525,645

UNITED STATES PATENT OFFICE 2,525,645

METHOD OF PROCESSING CITRUS PEEL AND CITRUS PEEL LIQUOR

Everette M. Burdick, Weslaco, and James S. Allen, McAllen, Tex., assignors to Texsun Citrus Exchange, Weslaco, Texas, a corporation Application April 13, 1948, Serial No. 20,814

15 Claims. (Cl. 99—2)

The invention relates to a method and apparatus for processing citrus peels and citrus peel liquors.

In the commercial production of dried citrus pulp from cull citrus fruit and peels it is very advantageous to destroy the gelatinous nature of these materials to eliminate sticking on hot surfaces during the drying operation. This is most readily done by enzymatic, or alkaline deesterification of the pectin which then coagulates in the presence of lime or calcium salts. Once the pectin is coagulated the solid citrus waste materials release a watery sugar solution that can be drained or pressed from the pulpy material and which is herein termed peel liquor.

These waste liquors or sugar solutions have presented not only a serious and difficult disposal problem because of their high Biological Oxygen Demand, but also a large loss because of their high content of organic matter. The dissolved organic matter in these liquors may vary from 10 to 14% and is largely sugar or carbohydrate. Biological Oxygen Demand varies from 40,000 to 50,000 P. P. M., and presents a tremendous load on streams or sewage disposal plants. Much interest has recently been shown toward the possible recovery and utilization of these wastes, because of their rapid increased production and the relatively high organic content.

Heretofore, the only effective treatment of these by-products or waste liquors has been concentration in multiple effect evaporators to produce a citrus molasses that can be marketed as a feedstuff.

However, this procedure entails certain difficulties foremost of which is the severe fouling or scaling of the multiple-effect evaporators. Overall costs of operation and maintenance of multiple-effect evaporators rapidly increases as scale builds up on the tubes, and at the same time capacity for producing molasses falls rapidly. Most plants have found it necessary to operate on very short cycles of production from three to six days and then cleaning the equipment because of this excessive scaling. Corrosion is also troublesome, especially in the condensate lines of the evaporators. Marketing, transportation and storage difficulties have arisen from foaming and frothing that occurs, especially during periods of hot weather. Although the exact reason or reasons are not known it appears that the frothing is due to a spontaneous decomposition of suspended material ordinarily left in the final peel molasses which produces carbon dioxide gas.

Several schemes have been proposed to reduce or eliminate the scaling in the multiple-effect evaporators, but none of these have been very successful. A general method has been proposed which involves heating the raw citrus peel liquors in high velocity heat exchangers prior to concentration in multiple-effect evaporators. This method of pre-treatment has certain good points; it tends to eliminate sugar losses due to fermentation, to reduce the non-condensable gases and volatile corrosive materials, and to produce most of the scale at this point. Some operators make a partial separation of the suspended materials before concentration by settling or centrifugals, but this is very difficult because of the slimy nature of the suspended materials. Other operators prefer to make no separation of suspended material before evaporation because of the above mentioned difficulties.

However, a scaling or fouling of the evaporator system has not been eliminated by the use of extra heat exchangers; severe scaling still takes place on the tubes of the multiple-effect evaporators. It is believed that most of this scale is due to the formation of insoluble citrates and pectinates which have inverted solubilities. These materials become less and less soluble with increasing temperatures, and also a certain amount of protein material is also coagulated by heat that also separates from the solutions. Additionally, suspended material that might tend to form scale is also trapped by the other scale forming materials and greatly increases the amount of scale within the evaporators.

The present invention is directed to a process and apparatus which for all practical purposes entirely eliminates scale formation on evaporator tubes, and plant equipment may be run indefinitely without taking the equipment out of operation and cleaning it. Broadly, the invention contemplates a process whereby complete removal of all scale forming materials is effected.

We have found that by a special application of submerged combustion, wherein the peel liquor is heated under certain desirable, but not necessary limiting conditions to be described, substantially all of the scale forming materials are precipitated from citrus peel liquors in a form which permits their separation by any suitable conventional methods.

An object of the present invention is to remove materials of a gelatinous nature from citrus pulp whereby such pulp can be subjected to heating to dry it without sticking to hot surfaces.

Another object of the invention is to provide a greatly improved citrus peel molasses by elimination of suspended solids.

Another object of the invention is to produce a citrus peel liquor that can be concentrated in an evaporator system without scale formation.

Another object of the invention is to produce a citrus peel molasses possessing relatively low viscosity with a low total suspended solid content.

Another object of the invention is to produce a citrus molasses that is more stable than could be formerly produced, and to eliminate frothing and foaming of the peel liquor molasses upon storage.

A further object of the invention is to precipitate the scale forming materials from peel liquor solution in such form as to permit their ready separation from the solution.

It is a further object of this invention to precipitate calcium citrate, calcium carbonate, and other calcium pectinic compounds in a form readily recoverable from citrus peel liquors, whereby the remaining liquid can be readily concentrated without the formation of scale.

A further object of the invention is to use submerged combustion to simultaneously concentrate a peel liquor solution while removing scale forming compounds therefrom.

Other objects and advantages of the invention will become more readily apparent from a consideration of the following description and drawings, which represents schematically a flowsheet illustrating the preferred embodiment of the invention:

In the operation of the invention the peels and pulp remaining after the fruit has been dejuiced is passed to a storage bin 2. From the storage bin such peels are conveyed to a hammer mill or other suitable type of pulverizer, such as hammer mill 3.

Prior to treatment in the hammer mill a quantity of lime may be added to the peel. The lime added may vary depending upon several conditions; however, it is advantageous to add enough lime to at least neutralize all acid forming substances present, and there will be an excess of lime present without affecting the final product after treatment. The lime added coagulates the pectin present in the pulp and peel and releases a watery solution therefrom. The water solution may be removed from the peels in any suitable manner, and to this end there is provided a plurality of bins 4, which are provided with openings therein through which the peel liquor or watery solution may be drained.

It has been found that the time required for this reaction to occur can be varied; however, most desirable results are obtained when the peels are allowed to remain in the bins from two to four hours.

After such time the pulverized pulp and peel remaining in the bins may be passed to a drier 5, which removes the water content thereof and produces a final product substantially granular in form. This product may be pulverized to any suitable size.

It is to be noted, as previously pointed out, that the materials having a gelatinous nature have been removed from the peel and pulp prior to subjecting such peel and pulp to heating to dry them. The elimination of these materials having gelatinous nature eliminates sticking of the pulp and peel on the hot surfaces of the dryer. Any suitable dryer may be used, and it has been found that a rotary kiln serves the purpose quite well. The granular product produced by such kiln serves as a stock feed. The liquor waste or effluent is drained from the bins and is passed through any suitable filtering means, such as screen 7, to remove any large solid particles therefrom. This solution is sometimes alkaline due to the excess of lime added to the peels and pulp prior to the pulverizing step; however in practice, the pH has been found to be about 5.8.

The liquid is then subjected to a heat treatment in a submerged combustion chamber 8. This chamber may be of any suitable configuration, and it has been found that a vertically arranged cone shape tank serves the purpose quite well. A conduit is positioned in the tank and is provided with a combustion chamber thereon. Air or oxygen, and a suitable fuel such as natural gas or the like, are injected into the conduit and combustion thereof effected in the combustion chamber.

It is to be pointed out that the combustion chamber is immersed in the peel liquor solution substantially below the surface level thereof, so that the products of combustion, mostly composed of carbon dioxide gas, are evolved into the solution and creating turbulence therein and become intimately intermingled therewith.

The temperature within the submerged combustion unit 8 may be varied depending upon various conditions. However, it has been found that best results are obtained when the peel liquor is maintained at a temperature of from 175 to 190° F. for a period of from 20 to 30 minutes. This temperature and time of operation is desirable because the calcium citrate comprises approximately 75% of the precipitate which is formed within the combustion unit, and it is believed that calcium citrate forms more readily at temperatures above 185° Fahrenheit.

Submerged combustion equipment is well-known and has been utilized in several different fields of application. It is not, therefore, believed necessary to give a detailed description thereof, since any submerged burner equipment could be practiced with the invention.

In addition to calcium citrate, calcium pectinate also forms a precipitate and a certain amount of protein material is coagulated by the heat and separates from the solutions. Colloidal material suspended in the peel liquor solution that migh tend to form scale when subjected to heat is also trapped by the other scale forming materials and is precipitated in the combustion unit 4.

Formation of a precipitate that will settle or filter with ease requires that the peel liquor solution be held for at least ten minutes at approximately 190° F. Somewhat shorter times are necessary at higher temperatures, while longer times are necessary at lower temperatures. However, a period of twenty to thirty minutes at a temperature of 175 to 190° F. is very satisfactory for large scale operation. Longer treating periods are not harmful and even have a certain advantage in that a higher degree of concentration is obtained. The combustion unit 4 not only serves to remove scale forming compounds from the peel liquor solution, but the solution will also be concentrated by the evaporation of water therefrom. The carbon dioxide evolved in the combustion unit will combine with any excess lime to form calcium carbonate, which will precipitate along with the other scale forming compounds. Due to the turbulence of the peel liquors within the submerged combustion unit the precipitate will continue to remain carried by the solution and will not form scale on the surfaces of the submerged combustion unit.

The submerged combustion unit may be operated either in a batch process or in a continuous process, and a suitable quantity of raw peel liquor can be injected to the combustion chamber in order to maintain a satisfactory liquid level therein, while at the same time draining that portion of the peel liquor from the submerged unit which has been treated for a sufficient length of time. The peel liquor containing the precipitate of suspended solids, calcium citrate, calcium pectinate, and calcium carbonate, and other protein material which may have formed a precipitate, is then subjected to a clarification treatment by any suitable method such as filtering, centrifuging, settling, or the like. It has been found that a Door thickener serves the purpose quite satisfactorily, and any suitable size may be used depending upon the capacity of the plant. The precipitate, above mentioned, which is separated from the solution, can be reinjected into the system at any suitable point and is shown as being introduced at 10 along with the lime which is preferably before the pulp and peels are pulverized. The peel liquor effluent removed from the Door thickener is then subjected to a second heating in a submerged combustion chamber 11. This second treatment serves to remove any residual traces of scale forming compounds which might be contained in the peel liquor solution. The solution removed from the submerged burner 11, which has a precipitate dispersed therein, is passed to a second settling unit 13, which separates the precipitate from the solution. The precipitate may be injected through the line 14 to the point 10 back into the system.

The clear peel liquor effluent is removed from the second settling tank and subjected to heating in evaporator system 16, which concentrates the peel liquor to the desired consistency.

While the invention has been described wherein two submerged combustion units are utilized, the invention will work when only one combustion unit is used; however, it has been found that a more efficient separation of the scale forming materials from the solution is obtained when two submerged burners are used.

Additionally, it is to be pointed out that while the submerged burner has been described as being of the open flame type (i. e. the flame directly contacts the liquid), it seems obvious that fire tubes could be immersed in the solution to effect concentration thereof.

Broadly, the invention contemplates a method and apparatus for processing citrus peels and citrus peel liquors to obtain a suitable stock feed.

What is claimed is:

1. A method of processing citrous waste wherein the liquid wastes are separated from the solid waste comprising the steps of, pulverizing the citrous waste, adding thereto a quantity of alkaline reagent to render the subsequently separated liquid waste definitely alkaline, separating the alkaline liquid waste from the solid waste, subjecting the liquid waste to a heating wherein the products of combustion of such heating contact the liquid waste, clarifying the liquid waste, evaporating the resulting clarified liquor waste to a predetermined concentration.

2. A method of processing citrous waste wherein the liquid wastes are separated from the solid waste comprising the steps of, pulverizing the citrous waste, adding thereto a quantity of alkaline reagent to render the subsequently separated liquid waste definitely alkaline, separating the alkaline liquid waste from the solid waste, subjecting the liquid waste to a heating wherein the products of combustion of such heating contact the liquid waste, clarifying the liquid waste, and subjecting the solid waste to drying to reduce the same to the form of a dried material.

3. A method of processing citrous waste which includes separation of the solid from liquid wastes comprising the steps of, adding a quantity of alkaline reagent to the citrous waste to coagulate citrates, pectinic material and free the liquid therefrom, subjecting such freed liquid waste to heating wherein the products of combustion of such heating contact the liquid, separating suspended materials from the liquid waste to produce a liquid which is free of suspended solids and subjecting such liquid to heating to concentrate the liquid.

4. A method for separating liquid citrous waste from solid citrous waste and suspended slimy materials in the liquid waste comprising the steps of, adding an alkaline reagent to the solid citrous waste to coagulate citrate and pectinic material therein and to free the liquid content thereof, subjecting such freed liquid to a heating wherein the products of combustion are contacted with the liquid to precipitate the slimy suspended materials therein, separating the heated liquid from the precipitated slimy materials, and heating the liquid to concentrate it to a predetermined point.

5. The method of processing citrous waste wherein solid citrous waste is treated by a lime reagent to free liquid waste therefrom which is separated into a watery effluent from the remaining wet solids and the wet solids dried, comprising subjecting the watery effluent to a heating wherein the products of combustion of such heating contact the effluent, and thereafter concentrating the liquid by subjecting it to heat.

6. The method of processing citrous waste wherein solid citrous waste is treated by an alkaline reagent to free liquid waste therefrom which is separated into a watery effluent from the remaining wet solids and the wet solids dried, comprising subjecting the watery effluent to a heating while the products of combustion of such heating contact the effluent to precipitate suspended material and compounds present in the liquid formed with the alkaline reagent, and thereafter separating the heated liquid from such precipitates.

7. The method of processing citrous waste wherein solid citrous waste is treated by an alkaline reagent to free liquid waste therefrom which is separated into a watery effluent from the remaining wet solids, comprising subjecting the water effluent to a heating while the products of combustion of such heating contact the effluent to precipitate suspended materials and compounds present in the liquid formed with the alkaline reagent, separating the heated liquid from such precipitates and subjecting the liquid to a heating to evaporate the water therefrom and to concentrate the liquids to a predetermined paint.

8. The method producing peel liquor from citrous waste comprising the steps of, comminuting the citrous waste to a pulperous mass, adding a quantity of lime thereto, separating the resulting water alkaline peel liquor effluent from the pulp solids, heating said peel liquor effluent while the products of combustion of such heating contact the effluent to precipitate suspended materials and compounds present in the effluent formed with the added lime and to remove excess free lime from the effluent, separating the remaining peel liquid from such precipitated substances, subjecting said remaining peel liquid effluent to a second heating and contact with the products of combustion of such heating to remove residual traces of suspended materials, compounds formed with lime and excess free lime, separating said remaining heated peel liquid from such precipitates formed by the second heating.

9. The method of producing peel liquor from citrous waste comprising the steps of, comminuting the citrous waste to a pulperous mass, adding a quantity of lime thereto, separating the resulting peel liquor effluent from the pulp solids, heating said peel liquor effluent and contacting the products of combustion of such heating with the effluent to precipitate suspended materials and compounds present in the effluent formed with the added lime and to remove any excess free lime from the effluent, separating the remaining peel liquor from such precipitated substances, subjecting said remaining peel liquor effluent to a second heating and contact with the products of combustion of such heating to remove residual traces of suspended materials, compounds formed with lime and any excess free lime and subjecting the separated liquid to an evaporation to concentrate it to a predetermined point.

10. The method of producing peel liquor from citrous waste comprising the steps of, comminuting the citrous waste to a pulperous mass, adding a quantity of lime thereto, separating the resulting peel liquor effluent from the pulp solids subjecting said pulp solids to drying to reduce the same to a dried material, heating said peel liquor effluent and contacting the products of combustion of such heating with the effluent to precipitate suspended materials and compounds present in the effluent formed with the added lime and to remove any excess free lime from the effluent, separating the remaining peel liquor from such precipitated substances, subjecting said remaining peel liquor effluent to a second heating and contact with the products of combustion to remove residual traces of suspended materials, compounds formed with lime and excess free lime and separating said remaining heated peel liquor from such precipitates formed by the second heating.

11. The method of producing peel liquor from citrous waste comprising the steps of, comminuting the citrous waste to a pulperous mass, adding a quantity of lime thereto, separating the resulting water alkaline peel liquor effluent from the pulp solids, heating said peel liquor effluent and contacting the products of combustion of such heating with the effluent to precipitate suspended materials and compounds present in the effluent formed with the added lime and to remove excess free lime from the effluent, separating the remaining peel liquor from such precipitated substances, subjecting said remaining peel liquor effluent to a second heating and contact with the products of combustion to remove residual traces of suspended materials, compounds formed with lime and excess free lime, and recirculating said suspended materials, excess lime, and compounds formed with lime which were removed from the peel liquor effluent by said first and second heating steps to said comminuted waste citrous pulp.

12. In the method of processing citrous waste wherein solid citrous waste is treated by a lime reagent to free liquid waste therefrom which is separated into a watery effluent from the remaining wet solids, the step of subjecting the watery effluent to a heating wherein the products of combustion of such heating contact the effluent.

13. In the method of processing citrous waste wherein the solid citrous waste is treated by a lime reagent to free liquid waste therefrom which is separated from the wet solids, the step of subjecting the watery effluent to an open flame heating submerged therein to precipitate slimy suspended solids and any excess reagent therefrom.

14. In the method of processing citrous waste wherein the solid citrous waste is treated by a lime reagent to free liquid waste therefrom which is separated from the wet solids, the step of subjecting the watery effluent to an open flame heating submerged therein to precipitate slimy suspended solids and any excess reagent therefrom, and separating such precipitate from the effluent.

15. In the method of processing citrous waste wherein the solid citrous waste is treated by a lime reagent to free liquid waste therefrom which is separated from the wet solids, the step of subjecting the watery effluent to an open flame heating submerged therein to precipitate slimy suspended solids and any excess reagent therefrom, separating such precipitate from the effluent, and thereafter concentrating the effluent to a predetermined consistency.

EVERETTE M. BURDICK.
JAMES S. ALLEN.

REFERENCES CITED

The following references are of record in the file of this patent:

UNITED STATES PATENTS

| Number | Name | Date |
| --- | --- | --- |
| 1,991,242 | Cole et al. | Feb. 12, 1935 |
| 2,187,501 | Lissaner | Jan. 16, 1940 |
| 2,215,944 | Vincent | Sept. 24, 1940 |
| 2,298,623 | Jorgensen | Oct. 13, 1942 |
| 2,362,014 | Lissaner | Nov. 7, 1944 |